United States Patent [19]
Gale et al.

[11] Patent Number: 4,832,069
[45] Date of Patent: May 23, 1989

[54] TAPPING SUBTERRANEAN PIPES

[75] Inventors: John C. Gale, Monkton Lea; Howard J. Lang, Swindon; Charles Hurst, Beaconsfield, Bucks, all of England

[73] Assignee: Water Research Centre, Bucks, England

[21] Appl. No.: 8,164

[22] Filed: Jan. 29, 1987

[30] Foreign Application Priority Data

Jan. 30, 1986 [GB] United Kingdom ............... 8602272
Apr. 24, 1986 [GB] United Kingdom ............... 8610015

[51] Int. Cl.⁴ .................................................. F16K 43/00
[52] U.S. Cl. ........................................ 137/15; 137/318; 285/24; 285/197; 405/154; 408/1 R; 408/87
[58] Field of Search ................ 137/15, 315, 317, 318; 138/94, 94.3; 285/24, 27, 197; 405/154, 156; 408/87, 92, 1 R

[56] References Cited

U.S. PATENT DOCUMENTS

| | | | |
|---|---|---|---|
| 314,085 | 3/1885 | Van Norman | 137/318 |
| 578,418 | 3/1897 | Payne | 137/318 |
| 2,736,335 | 2/1956 | Webber | 137/318 |
| 3,104,456 | 9/1963 | Powell, Jr. | 137/15 |
| 3,799,182 | 3/1974 | Long | 137/318 |
| 4,119,115 | 10/1978 | Carruthers | 137/318 |
| 4,627,648 | 12/1986 | Montpetit | 285/197 |
| 4,647,073 | 3/1987 | Kosaka | 137/318 |

Primary Examiner—George L. Walton
Attorney, Agent, or Firm—Watson, Cole, Grindle & Watson

[57] ABSTRACT

Subterranean service pipes, eg. water mains, are tapped by minimal excavation to expose the upper half of the main and then locating (with respect to the main) a conventional pipe-tapping device but without employing means encircling the pipe. Thus, a clamp can be used, or a saddle adhesively secured to the pipe. The clamp or saddle preferably provide means for proper orientation of the drilling and tapping tool with respect to the main.

7 Claims, 7 Drawing Sheets

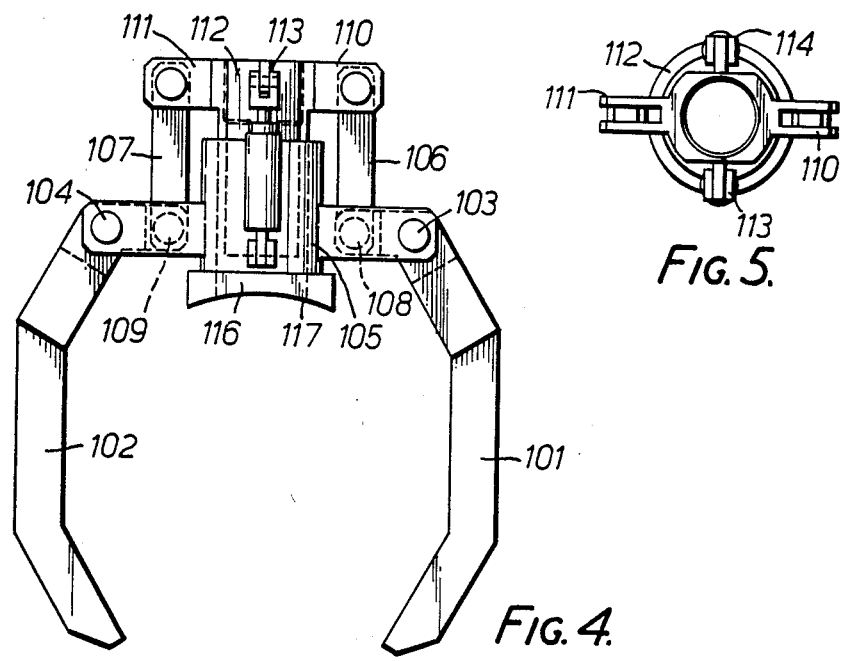
FIG. 4.
FIG. 5.
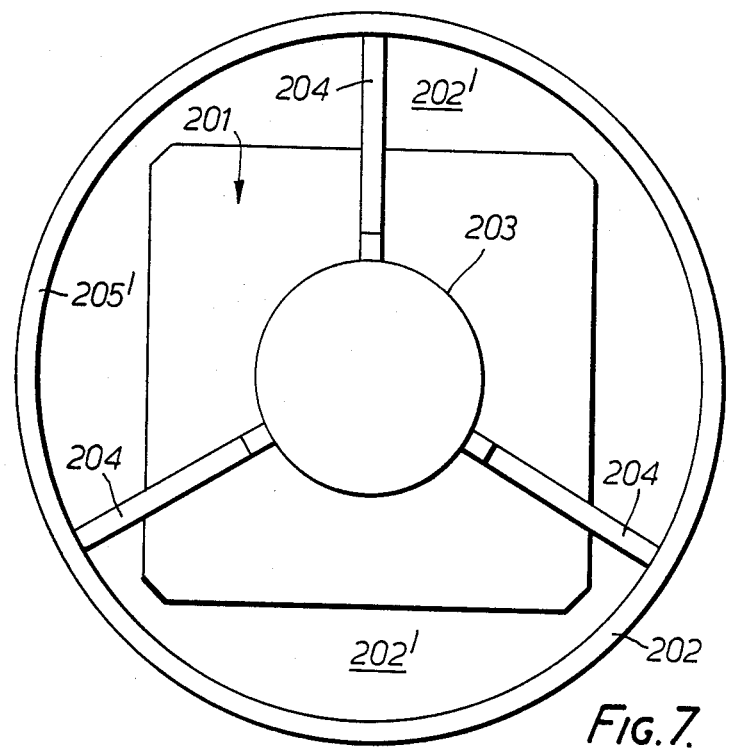
FIG. 7.

TAPPING SUBTERRANEAN PIPES

This invention relates to under pressure tapping of pipes and particularly, but not exclusively, to tapping liquid-containing pipes such as water mains whilst the liquid is under pressure therein.

It is well known in the water industry to tap a water main whilst the main is operational, i.e. without turning off the water flow under pressure in the main. The known technique involves excavating to expose the main, and then cutting a hole in the main and tapping a screw thread therein. Tools have been developed whereby as the main is cut and tapped, water leakage can be avoided. One problem is to hold the tools in position against the mains pressure, and this is effected by excavating below the main and passing one or more chains or straps around the main, the tools being secured (directly or indirectly) to the chain(s) or strap(s) (see, for example, U.K. patent specification No. 1220973). It is possible in this way to hold the tools in position whilst they are exposed directly to the water pressure.

In this known technique, the excavation is conveniently large enough for man entry, e.g. 2m × 1.5m x depth to below the main. This size of excavation is relatively costly not just because of the volume of earth etc. to be moved, but also because of the substantial expense of reinstatement when tapping has been completed.

Attention has focussed in recent times on the desirability of establishing the water flow patterns in pipe networks in order, for example, to be able to improve the networks and, consequently, the water supplies therefrom. In order to do this, it is necessary to insert flowmeters into existing subterranean water mains. Flowmeters are available which are especially designed for this purpose, but the cost of conventionally tapping a working main is so high as to limit severely the number of meters which can be installed. If the installation cost could be reduced, then of course more meters could be installed and better information obtained about the pipe networks.

It has been suggested that the installation cost could in principle be reduced if less excavation was required. We have investigated this matter and have now developed a method whereby a water main can be tapped (and thus a flowmeter or other device inserted therein, if desired) using a much smaller excavation than previously, thereby substantially reducing the total cost.

According to the present invention, we have found that, during tapping, it is possible to hold tools in position against mains pressure without encircling the main with a chain, strap or the like. As a result, it is not necessary to excavate below the main and, indeed, in accordance with a preferred feature of the invention, the depth of excavation need only be at most to just below the upper half of the main. Furthermore, the excavation does not need to be of man-entry area, but will normally be of a width (transversely of the main) not much more than the diameter of the water main, and of a breadth only sufficient to accommodate the liner (as described later). These features together enable a very substantial reduction in excavation cost (and thus in reinstatement cost) to be achieved while still enabling satisfactory tapping to be carried out. Whilst the present invention is intended to be of use primarily with water mains of diameter from 12 to 54 inches (30 to 135 cm), in practice the vast majority of mains for which it will be applicable will be from about 12 to 15 inches (30 to 38 cm) diameter.

In accordance with a preferred feature of the present invention, we have found that an at least temporary "anchor" can be provided to hold the tool on the water main against the water pressure (without encircling the main) by using a particular type of clamp member. One preferred form of clamp comprises a body for positioning on the top of the main, the body having depending therefrom a pair of generally arcuate jaw members to clamp against opposite sides of the main on the lower half of the main. (The clamp is novel per se and forms another aspect of the invention.) It is possible in this way for the clamp to grip the main sufficiently to hold a working tool, subjected to the outwardly directed force of the main water, against the main. Once the main has been tapped, the clamp can be removed for re-use.

In accordance with another preferred feature of the invention, we have found that an "anchor" for the tapping tools can be obtained by fixing a member, such as a saddle, on the main using adhesives for example. The saddle will most preferably comprise a curved sole plate to fit snugly on, and thus be securely adhered to, the main. (The saddle is novel and forms another aspect of the invention.) We have found that, provided the surface of the main is well cleaned and otherwise in sound condition, satisfactory anchorage can be obtained using adhesives. We prefer to use for this purpose a saddle having a circular aperture therein, the tap being formed through the aperture. Whilst the use of a saddle member is preferred, it is not essential. One or more other member(s) can be used provided that they can subsequently provide an anchorage for the tapping tools.

In accordance with another preferred feature of the invention, an "anchor" can be provided on the main by welding one or more studs thereto, and utilising the studs to locate a saddle or other member thereon. Stud welding devices are currently available for use in this way. All these methods can be used without having to excavate below the main.

The size (horizontal area) of excavation should of course be as small as possible consistent with enabling both the above operations, i.e. providing an "anchor" and the subsequent tapping, to be carried out. For this purpose, we prefer to use vacuum excavation which is itself a known technique which we have found to be very useful for providing small area excavations. It is not essential to the present invention for the excavation to be small and, indeed, the "anchor" techniques described, and the "alignment" techniques to be described, could be used with conventional excavation, but then of course the very substantial cost savings would not be obtained.

Where, as will normally be the case, cost saving is important, minimum excavation necessitates accurate mains detection. Sophisticated metal detectors are preferably used for this purpose, both to locate the position where excavation is to start, and also preferably to monitor the excavation as it progresses to ensure that it accurately finds the desired water main.

In accordance with another preferred feature of the present invention, we have found that when a small area excavation has been made to expose a water main, and sufficient of the main has been exposed to receive an "anchor" as previously described, it is highly advantageous to provide some means for proper alignment of the tapping tools. Thus, we have found that if the tapping is made other than strictly radially of the main and orthoganol (perpendicular) to its longitudinal axis, problems will usually arise. One such problem could be, for example, that it might be impossible to locate the flowmeter (inserted through the tapping) on the longitudinal axis of the main. Mis-alignment will normally lead to false readings. Thus, accurate positioning of the tapping is very important and this is made difficult because of the (deliberately) restricted access to the main. Accordingly, a highly preferred feature of the present invention comprises the provision of means to enable accurate alignment (radially of the main and perpendicular to the longitudinal axis thereof) of the tapping (and, hence, of the tapping tools).

When a clamp is used as the "anchor" (as described above), we greatly prefer to provide on the underside of the body of the clamp, a plate to bear on the upper surface of the main and thus automatically (as the clamp is tightened) ensure exact alignment of the body of the clamp. The tapping tools are then located relative to the body to ensure the desired correct alignment thereof.

Where, instead of using a clamp, a saddle is to be adhered to the main to provide the desired "anchor" we have devised another method of ensuring alignment. In this method, the main is exposed and then a vertical pipe (e.g of 30 cm diameter) is accurately positioned to extend from the main to the ground level, the pipe extending radially outwardly of the main and normal to the longitudinal axis of the main. This pipe, once positioned, serves as the alignment guide for the subsequent adherence of the saddle, and various tapping operations.

Where a welding technique is to be used, the studs must be welded accurately in position and, for example, either an automatic alignment device can be used (e.g. similar to the clamp), or a vertical pipe arrangement can be utilised.

Once the alignment means has been placed and the "anchor" is in position, the tapping operation proper can begin. This operation is essentially conventional. A valved tool is used to tap a hole in the main and a closure ferrule is screwed into the hole to close it. The tapping apparatus is then removed, and another tool is provided to remove a plug from the ferrule and insert a flowmeter therethrough into the main. Normally, the flowmeter is attached to a threaded plug for closure of the ferrule, and to various electrical and/or electronic components to process the output from the flowmeter. Such arrangements are known in the art and are commercially available.

In order that the invention may be more fully understood, reference is made to the accompanying drawings in which:

FIG. 4 is a side view of one form of clamp useful in the invention;

FIG. 5 is a top plan view of the body portion of the clamp of FIG. 4;

FIG. 7 is a section on the line E—E of FIG. 6.

Figure 1:
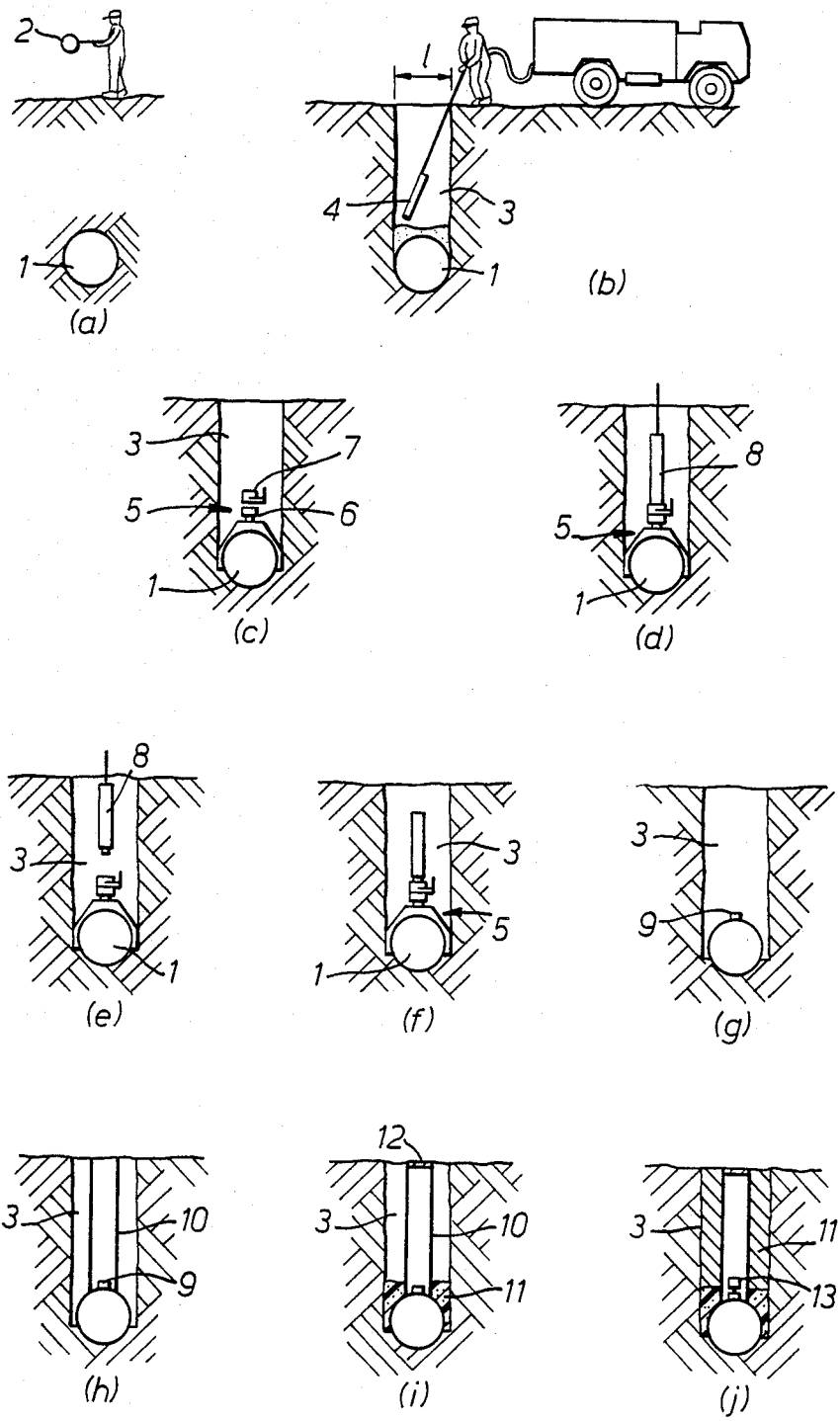
FIG. 1 shows schematically the steps involved in one embodiment of method of the invention using a clamp.

Referring to FIG. 1, an embodiment of the invention as illustrated as comprising ten steps, (a) to (j). The first step (a) comprises accurately locating the subterranean water main 1 using one or more metal detectors 2. Having located the position of the main 1, a slit trench 3 is excavated using a vacuum excavation tool 4 (step (b)). The trench has a length "1" slightly greater than the diameter of the water main 1, and a width of less than the length. Having completed the excavation, a clamp 5 is lowered onto the main (step (c)). The clamp (embodiments of which are described hereinafter) comprises a body 6 and valve 7 which (subsequently) receive the tapping tools. The clamp is such that the body and valve are automatically positioned to achieve appropriate alignment of the tools and, hence, of the tapping. In the next step (d), a hole is cut and tapped in the main. The water pressure in the main is held by the clamp, in that the water pressure is exerted on the saw and tapping tool 8 which in turn is fixed to the clamp. After removal of the hole saw 8 (step (e)), the tapping is plugged (step (f)) by screwing therein a ferrule 9 which itself includes a removable plug member (not shown). The clamp is now removed (step (g)) and can, of course, be re-used. There is now inserted (step (h)) into the excavation a liner 10 to extend from the main to ground level. The lower end of the liner encloses the ferrule 9 with the latter being on the axis of the liner, and the liner extends co-axially of the ferrule. The liner is now fixed in position (step (i)), for example by in-filling around it with polyurethane foam 11 or the like to locate it firmly in position. A cover 12 is then provided to close the top of the liner 10. In this way, reinstatement costs are kept low. Finally (step (j)), a valve 13 is positioned onto the ferrule, the ferrule plug removed and a flowmeter inserted and positioned in the water main. The electrical/electronic control box (not shown) associated with the flowmeter is positioned in the liner.

Figure 2:
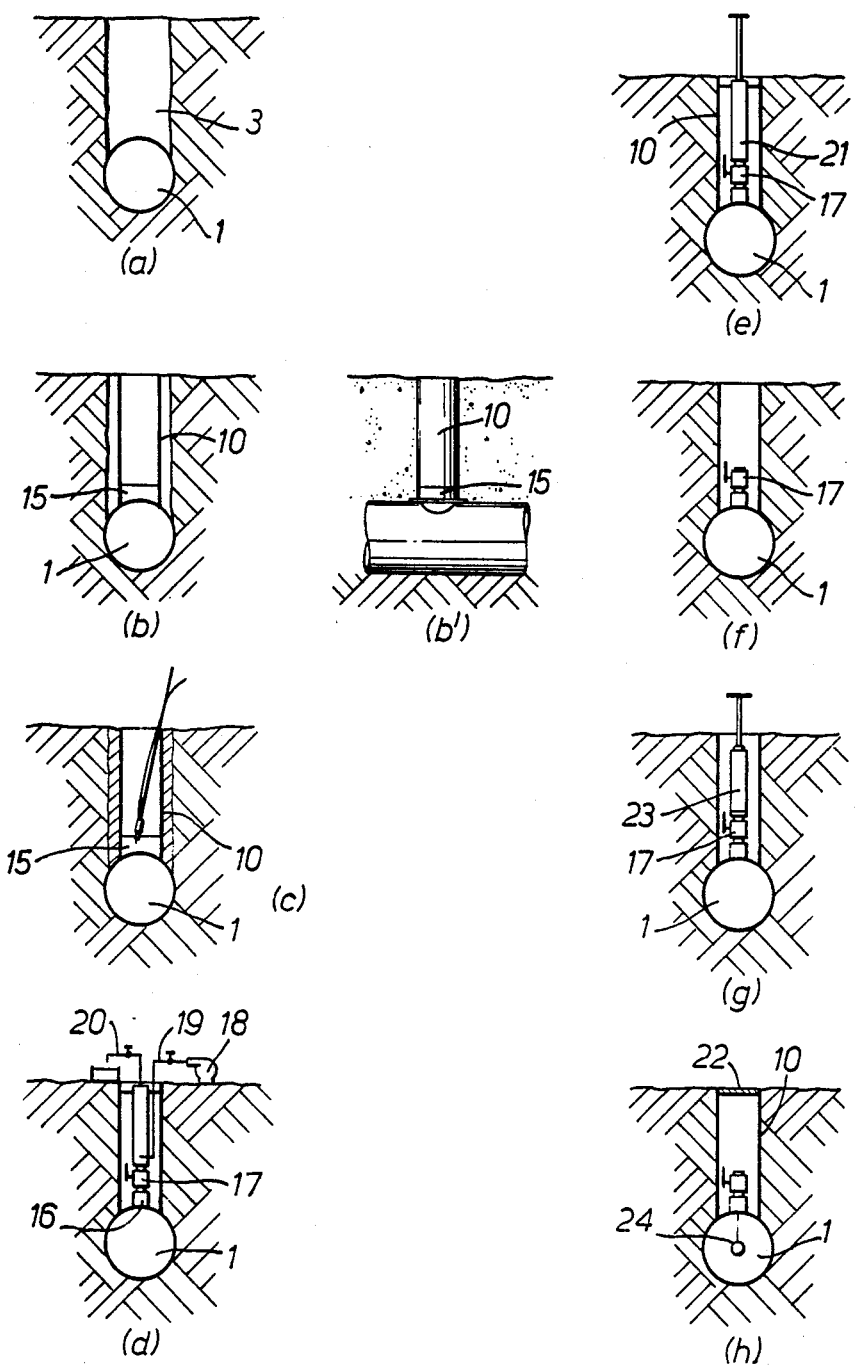
FIG. 2 shows schematically the steps involved in another embodiment of the method of the invention using a saddle adhesively mounted on a main.

In the embodiment of FIG. 2, instead of using a clamp to withstand the main water pressure and to ensure alignment, a saddle is used which is secured to the main by adhesive. Taking each of the steps in turn, the water main 1 is detected and a small excavation 3 made to a depth to expose the upper half of the water main (step (a)). The next step (step (b)) involves accurately positioning a liner to extend from the main to ground level, the liner being radial of the main 1 and perpendicular to the longitudinal axis of the main (this is called "aligned"). This is achieved by providing a collar member 15 shaped to fit snugly on the main, with one end of the liner received within the collar. The collar is profiled so that, when it is seated on the main, the liner is automatically "aligned" (see side view (b')). Most conveniently, the liner is secured to the collar, and then the collar (on the end of the liner), is adhered to the main. In-filling is then completed around the outside of the liner. In this way, the liner is secured in alignment relative to the main. The side view in FIG. 2(B') shows a liner normal to the longitudinal axis of the main.

In the next step, the area of the main lying within the collar and liner is cleaned (step (c)) to ensure good adhesion by a saddle 16 (step (d)). In step (d), a saddle fitting snugly in the liner is placed on, and secured by adhesive to, the main 1. The liner 10 ensures accurate positioning of the saddle. The saddle includes a control aperture through which the tapping is to be made into the main. A valve member 17 is fitted to the saddle. In order to ensure satisfactory securement of the saddle to the main, it is pressure tested in step (d) using pump 18 and flow and return lines 19,20, respectively. Step (e) involves drilling and tapping the main. The tool 21 is guided by the liner 10, and is thus held in alignment so that the tapping so made is in alignment. If the tapping was not properly aligned, it could be very difficult if not impossible subsequently to locate the flowmeter properly, and also it could be very difficult actually to introduce the flowmeter into the main by passing it (with its associated plug and controls) down the relatively narrow liner 10. Accordingly, accurate alignment is important.

Figure 3:
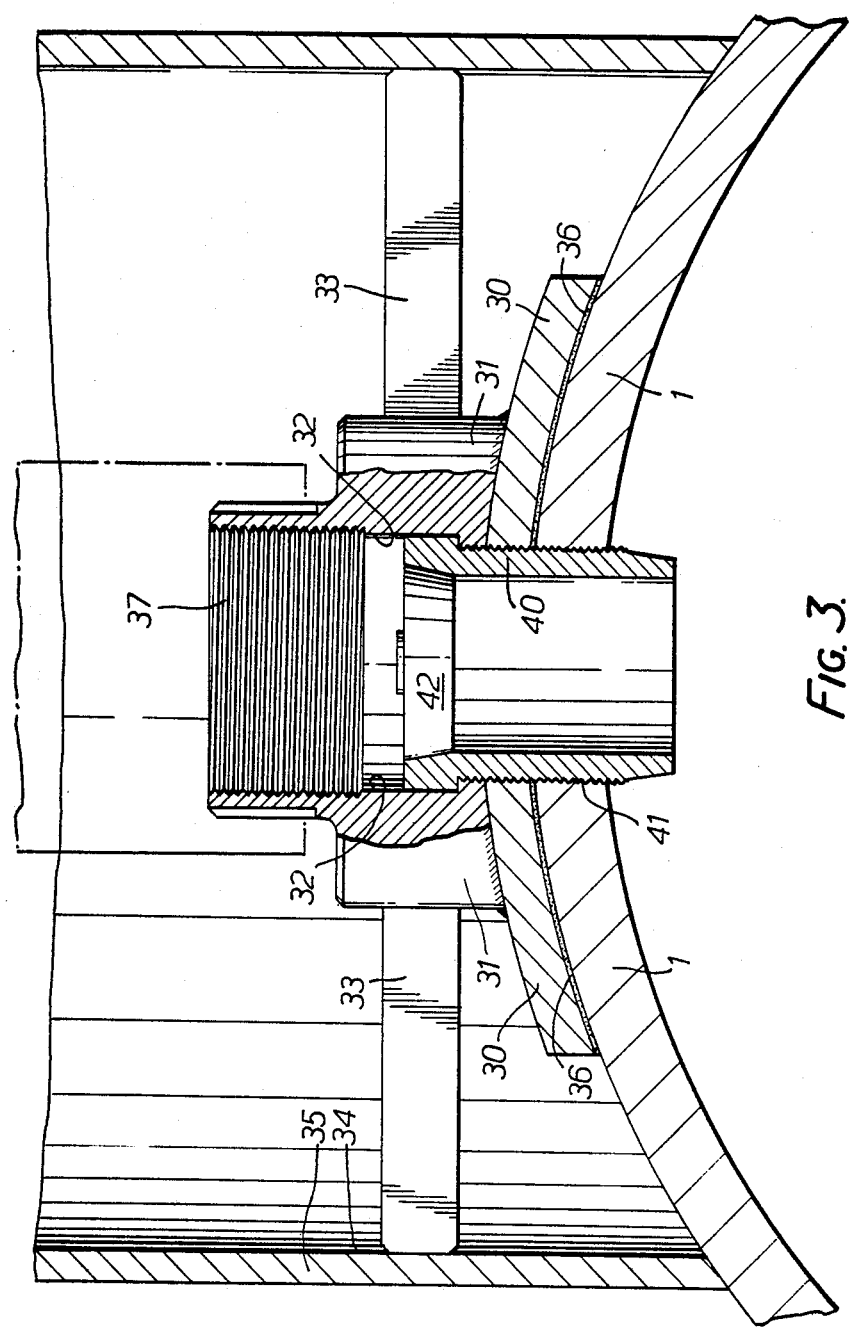
FIG. 3 is a sectional view of a ferrule located in a tapping in the main by the method shown in FIG. 2.

After removal of the drill tool 21 (step (f)), a ferrule is fitted into the tapping using tool 23 (step (g) - see also FIG. 3) and the flowmeter 24 is then introduced. Finally (step (h)), a cover 22 is placed over the top of the liner to close off the excavation.

FIG. 3 is a somewhat schematic sectional detail of a saddle 30 adhered by adhesive 36 to a main 1. The saddle 30 includes an upstanding annular flange 31 defining a through bore 32, through which the tapping is effected. Extending radially outwardly of the flange are three (two shown) guide arms 33 which touch the inner wall 34 of the liner 35 and centre the saddle in the liner to ensure alignment. The upper inner wall of the flange 31 has a screw thread 37 to receive a valve and for connection to other items.

FIG. 3 also shows a ferrule 40 screwed into the tapping 41 in the wall of the main. The ferrule is tubular with a removable plug 42 to allow access to the main for placement of the flowmeter.

FIGS. 4 and 5 show one form of clamp useful in the method of the invention. It comprises a pair of clamp arms 101,102 which are each pivotally mounted to a tubular body 105 at pivots 103,104 respectively. From their respective pivots, each arm extends inwardly and terminates at a pivot 108,109 respectively, where each is mounted to the lower end of a respective elongate link 106,107.

The links 106,107 extend vertically and are mounted at their upper ends to opposed arms 110,111 on an annular yoke member 112. The yoke 112 has another pair of opposed arms 113,114 which are each attached to a hydraulic cylinder (only one cylinder, 115, is shown) mounted on body 105. On the underface of body 105 is a sole plate 116 having an arcuate lower face 117 profiled to fit snugly on the outer surface of a water main. (Differently shaped sole plates are used for differently sized water mains. Likewise, arms 101, 102 are preferably made so as to be adjustable in length for use with differently sized mains).

Sole plate 116 has a circular aperture therein so that there is an open bore extending axially through the clamp from yoke 112 to plate 116. It is through this bore that the hole cutting and tapping tools operate.

In use, the clamp is placed on a water main with the lower ends of the arms 101, 102 extending to the opposed sides of the lower half of the main (but not to the bottom of the main). Sole plate 116 is seated on the main. The hydraulic cylinders are then actuated to raise yoke 112 relative to body 105. Opposed arms 110, 111 are thus raised (with yoke 112) and, via links 106, 107, cause arms 101 and 102 to tighten around, and grip, the main. At the same time, plate 116 is pressed firmly down to seat on the main. The clamp is thus secured about the main and the axis of the through bore of the clamp is "aligned", i.e. it extends radially of the main and is normal to the longitudinal axis thereof.

Figure 6:
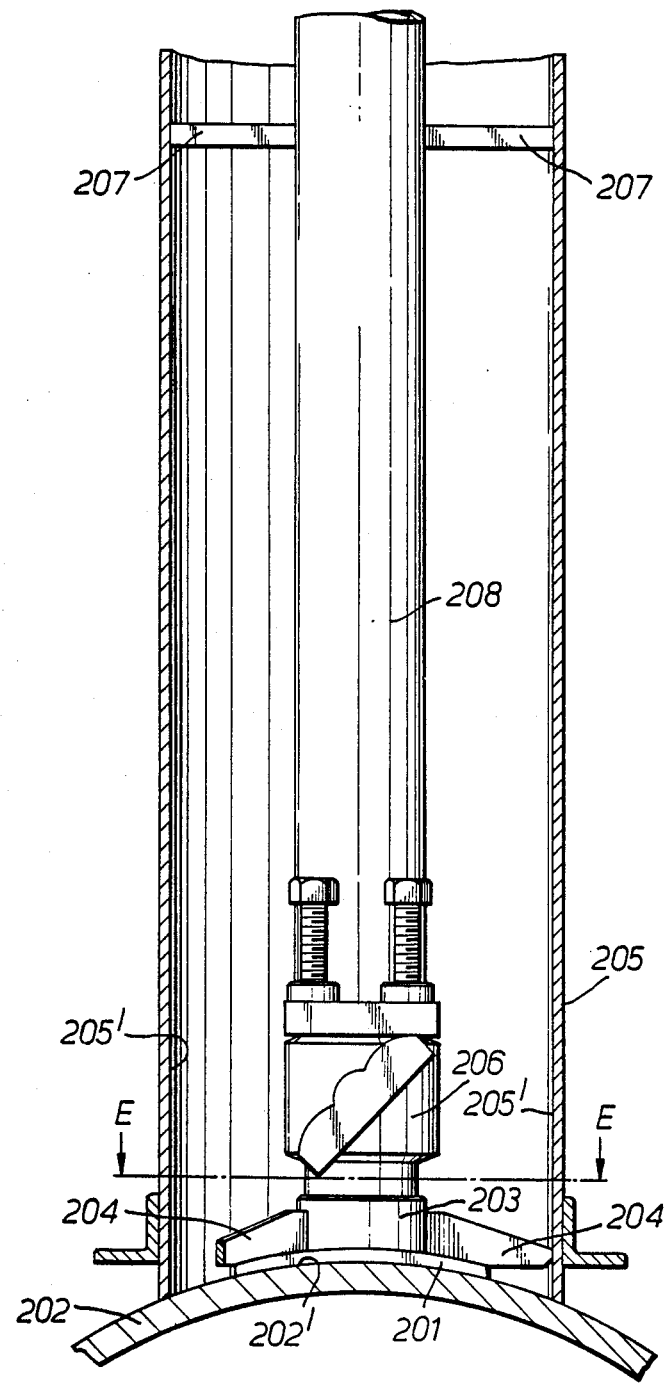
FIG. 6 is a schematic view of the use of an adhesive saddle, with the hole cutting drill in position.

FIGS. 6 and 7 illustrate the use of an adhesively mounted saddle (the method of FIG. 2). As drawn, there is shown the saddle sole plate 201 adhered to the outer surface 202' of mains pipe 202, the saddle including an upstanding flange or collar 203 having three radial spacer arms 204 which just touch the inside wall 205' of liner 205 and so position the saddle accurately within the previously aligned liner 205. The saddle is as shown in FIG. 3. A valve 206 is mounted on collar 203 and a conventional drill machine 208 mounted over the valve, to cut a hole in water main 202. The drill has spacer arms 207 to centre it within the liner 205 to ensure accurate alignment of the tapping.

Figure 8:
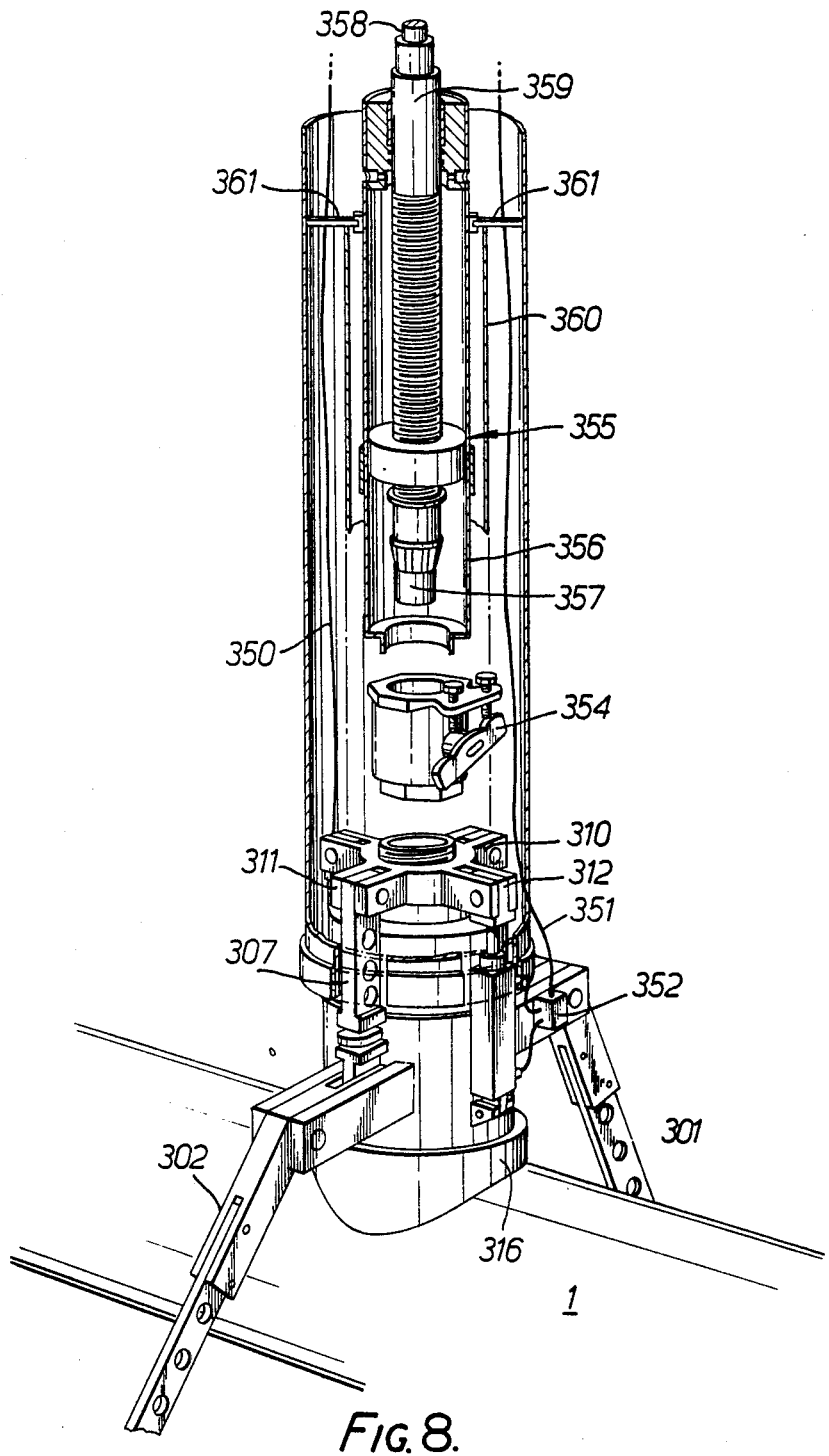
Figure 9:
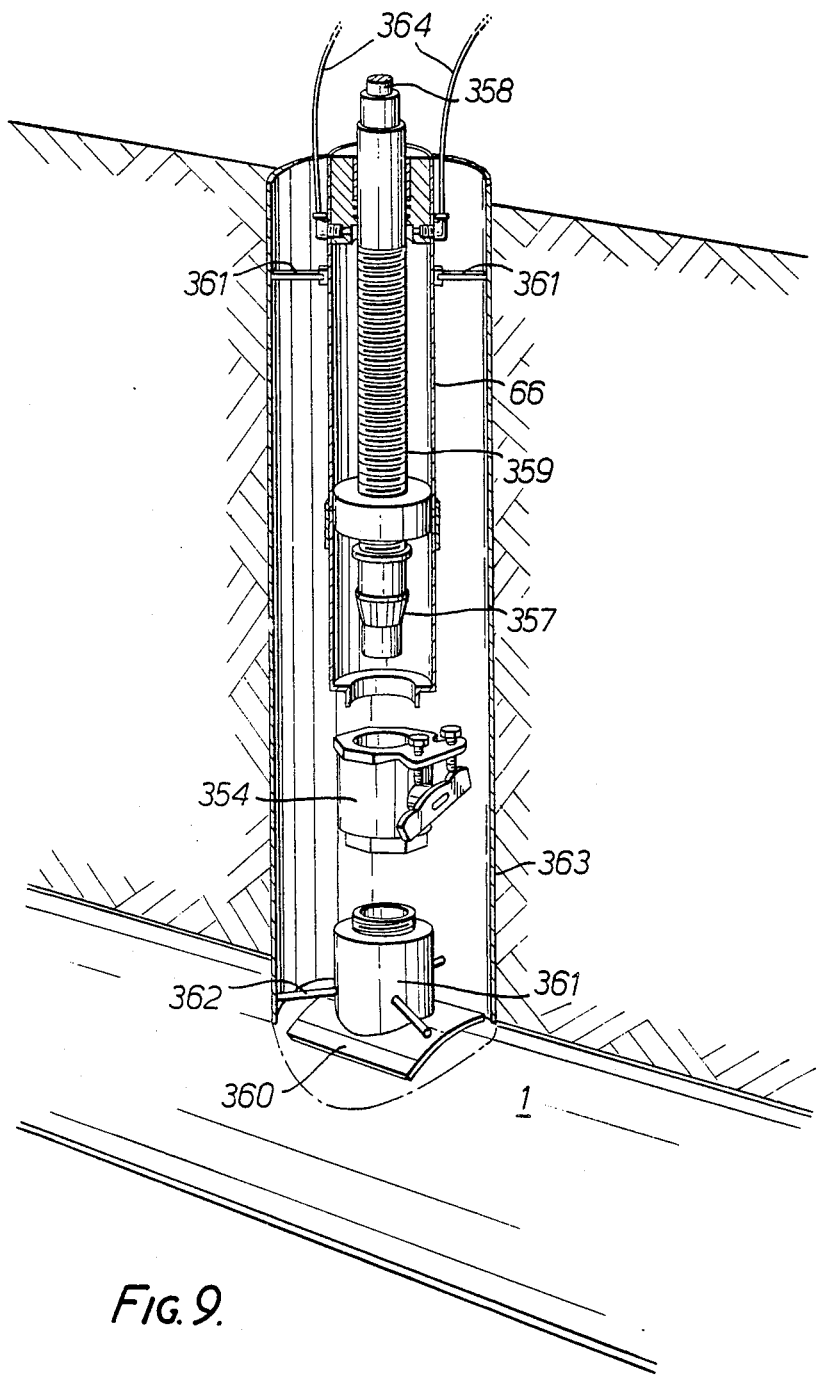

FIGS. 8 and 9 are part cut-away orthoganol views illustrating the clamp method and the adhesive method of the invention, respectively. Referring to FIG. 8, water main 301 has a clamp (generally as previously described with reference to FIGS. 4 and 5) attached thereto. Thus, the clamp has pivoted arms 301,302 each connected to one end of a link 307 (only one visible) the other end of each respective link being attached to opposed arms 310, 311 of an annular yoke 312. The other pair of opposed yoke arms 313, 314 are each attached to a hydraulic cylinder 315 (only one visible) supplied with hydraulic fluid via supply lines 350, 351 and manifold 352 (only one visible). Operation of the clamp to grip the main 1 is as previously described. The clamp has sole plate 316. A PVC liner 353 is provided and the various tools are inserted therein to the main 1. Ball valve 354, drill tool 355 having drill housing 356, drill and tapping head 357, drill shaft 358 and feed screw 359 are shown by way of illustration. A "steady housing" 360 is also shown: this is attached to the clamp and together with location bars 361 helps to keep the tools properly aligned.

FIG. 9 is very similar to FIG. 8 and like numerals indicate like parts. However, in place of the clamp of FIG. 8, a saddle 360 is adhered to main 1. The saddle has upstanding flange 361 with spacers 362 to accurately position the PVC liner 363. Also shown are water feed pipes 364 to tool housing 366 for pressure testing to check the effectiveness of the adhesive bonding of the saddle to the main, prior to drilling and tapping.

We have previously described herein a preferred feature of the invention whereby "an anchor" for the tapping tools can be obtained by fixing a member, such as a saddle, on the main. The member can for example be adhered to the main or located on studs welded on the main. In accordance with a further aspect of the invention, the studs can be fixed to the main by brazing, eg. by the socalled "pin brazing" technique. It is also possible to braze a saddle directly to a main, if desired, although the use of brazed studs is preferred. The studs will normally have their axes parallel (rather than all radially of the main) so that they can conveniently be received in corresponding bores in the sole plate of the saddle, to locate and fix the latter relative to the main. As will be understood, when studs are used (either welded or brazed), adhesive is unnecessary if means are provided (as is preferred) to secure the saddle with respect to the studs. Compared with welding, brazing is generally to be preferred for use in small excavations.

It is known to connect a metal water pipe (eg. a main) electrically to a sacrificial anode and/or to other metal pipes. This can be achieved using studs brazed on to the metal pipe, the studs being joined to an electric wire connected, for example, to a sacrificial anode. The brazed studs used in accordance with a feature of the present invention can also be connected to an electric wire for electrical purposes if desired.

In the description given herein, we have referred to the use of saddles having a curved sole plate to fit snugly on the main. Such saddles can be in the form of castings. However, it is also possible to use saddles having a flexible sole plate which can be shaped on site to fit the particular pipe to which it is to be fitted. On-site shaping has obvious advantages. Such saddles can have, for example, a metal sole plate which is generally flat but which can be bent to conform to the pipe. The plate can be such that it is spring-like or resilient, in which case, after applying adhesive, it must be held in the desired configuration on the pipe until the adhesive has cured. Alternatively, the plate can be non-springy, in which case after bending into the the required shape it can be adhered to the pipe in the same way as a casting. The adhesive itself fills the small gaps between the sole plate and the main.

We have particularly described various aspects of the invention with reference to tapping pipes. The invention also includes, however, in broader aspect the use of saddles for attachment (as described herein) to bodies other than pipes, eg. to other vessels such as boilers or vats etc. For this purpose, adhesives are preferred. The sole plates of the saddles can be rigid castings or of flexible metal sheet as described. The invention thus includes these saddles per se, and their use not only in tapping pipes but in connection with other vessels for tapping or any other use.

We claim:

1. A method of tapping a subterranean pipe such as a water main while the pipe contents remain under pressure therein, which comprises the steps of:
   (a) making an excavation to expose the pipe;
   (b) placing a liner tube substantially vertically in said excavation to extend from the exposed pipe to ground level;
   (c) accurately positioning the liner tube in the excavation to extend radially from the pipe and normal to the longitudinal axis of the main;
   (d) fixing said tube in its position in said excavation by infilling the excavation around the liner tube;
   (e) inserting, from ground level, pipe drilling and tapping apparatus into said liner using said liner as a guide in order to position said apparatus accurately radially of the pipe and normal to the main axis of the pipe; and locating said apparatus with respect to the pipe by attaching said apparatus to a locating member fixed to said pipe without employing means encircling the pipe; and
   (f) drilling and tapping said pipe from ground level using said apparatus so positioned in said liner tube.

2. A method according to claim 1, wherein in step (a) the excavation is made only to a depth to expose the upper surface of the pipe.

3. A method according to claim 1, wherein, in step (b), an end of said line tube abuts the pipe, and wherein said end is contoured to fit snugly on the pipe and so aid in the accurate positioning thereof in step (c).

4. A method according to claim 1, which comprises, after step (d), the further step of adhering the locating member to the pipe surface from within said liner tube, said tube serving to accurately position said locating member on said pipe, said locating member subsequently serving to hold the said pipe drilling and tapping apparatus with respect to said pipe.

5. A method according to claim 4, wherein said locating member is a saddle member which comprises a sole plate for seating on the pipe surface, the plate having a circular aperture therein, an annular wall member upstanding from the plate around said aperture and defining with the aperture a through bore; and guide means for engaging the liner tube to maintain the saddle member accurately positioned therein so that the saddle member is secured to the pipe with the sole plate seated on the pipe surface and the bore axis orthogonal to the longitudinal axis of the pipe.

6. A method according to claim 4, wherein said locating member is a saddle member comprising a shaped sole plate for adherence to the pipe surface, the plate having a circular aperture therein, and an annular wall member upstanding from said plate and concentric with said aperture and defining a bore; and wherein valve means are provided attached to said annular wall whereby said bore can be opened or closed by operation of the valve means.

7. A method according to claim 4, wherein said locating member includes a screw thread for engagement with a corresponding screw thread on said pipe drilling and tapping apparatus to hold said apparatus with respect to said pipe.

* * * * *